United States Patent
Ikeda et al.

(10) Patent No.: US 9,744,692 B2
(45) Date of Patent: Aug. 29, 2017

(54) THREE-DIMENSIONAL SHAPING DEVICE AND THREE-DIMENSIONAL SHAPING METHOD

(71) Applicant: Keyence Corporation, Osaka (JP)

(72) Inventors: Shigeki Ikeda, Osaka (JP); Ryohei Suzaki, Osaka (JP)

(73) Assignee: Keyence Corporation, Osaka (JP)

( * ) Notice: Subject to any disclaimer, the term of this patent is extended or adjusted under 35 U.S.C. 154(b) by 716 days.

(21) Appl. No.: 13/867,271

(22) Filed: Apr. 22, 2013

(65) Prior Publication Data
US 2013/0228953 A1    Sep. 5, 2013

Related U.S. Application Data

(63) Continuation of application No. PCT/JP2011/073776, filed on Oct. 17, 2011.

(30) Foreign Application Priority Data

Nov. 1, 2010  (JP) ................................. 2010-245086

(51) Int. Cl.
*B29C 31/04* (2006.01)
*B29C 67/00* (2017.01)
*B33Y 10/00* (2015.01)
*B33Y 30/00* (2015.01)
*B33Y 50/02* (2015.01)

(52) U.S. Cl.
CPC ........ *B29C 31/042* (2013.01); *B29C 67/0059* (2013.01); *B29C 67/0092* (2013.01); *B33Y 10/00* (2014.12); *B33Y 30/00* (2014.12); *B33Y 50/02* (2014.12)

(58) Field of Classification Search
CPC ................................. B29C 31/042
See application file for complete search history.

(56) References Cited

U.S. PATENT DOCUMENTS 6,259,962 B1    7/2001   Gothait
2005/0023719 A1  2/2005   Nielsen et al.

FOREIGN PATENT DOCUMENTS

| JP | 06-143438 | 5/1994 |
|----|-----------|--------|
| JP | 2004-090530 | 3/2004 |
| JP | 2004-255839 | 9/2004 |
| JP | 2004-291625 | 10/2004 |
| JP | 2005-125787 | 5/2005 |
| WO | 2005009723 A1 | 2/2005 |

*Primary Examiner* — Larry Thrower
(74) *Attorney, Agent, or Firm* — Kilyk & Bowersox, P.L.L.C.

(57) ABSTRACT

Control means performs control such that a head section 20 is caused to perform reciprocating scanning in one direction, a model material MA and a supporting material SA are ejected onto a shaping plate 40, and the model material MA and/or the supporting material SA are cured in at least any one of forward and backward paths of the reciprocating scanning, to form slices, and relative positions of the shaping plate 40 and the head section 20 are moved in a height direction to repeat lamination of the slices, thereby performing shaping, and on a line where the model material MA and the supporting material SA are located in a scanning direction of a shaped object, the model material MA and the supporting material SA are not simultaneously ejected during the same reciprocating scanning, but only one shaping material can be ejected and cured.

9 Claims, 11 Drawing Sheets

THREE-DIMENSIONAL SHAPING DEVICE AND THREE-DIMENSIONAL SHAPING METHOD

CROSS-REFERENCE TO RELATED APPLICATIONS

The present application is a continuation of PCT/JP2011/73776, filed Oct. 17, 2011, which claims foreign priority based on Japanese Patent Application No. 2010-245086, filed Nov. 1, 2010, the contents of which is incorporated herein by reference.

TECHNICAL FIELD

The present invention relates to a three-dimensional shaping device and a three-dimensional shaping method for producing a stereoscopic shaped object in an inkjet manner.

BACKGROUND ART

Conventionally, there has been known a device which sequentially laminates resin layers on respective cross sections obtained by cutting off a shaped object in a plurality of parallel planes, to perform stereoscopic shaping, so as to form a shaped object to serve as a three-dimensional model of the shaped object.

In the field of rapid prototyping (RP) used for prototyping and the like in product development, a laminate shaping method which enable three-dimensional shaping has been employed. As the laminate shaping method, such a matter formed by slicing three-dimensional CAD data of a product and laminating thin plates is prepared as original data for manufacturing, and materials such as powder, resins, steel plates, and paper are laminated thereon, to prepare a prototype. As such a laminate shaping method, there are known an inkjet method, a powder method, an optical shaping method, a sheet laminating method, an extrusion method, and the like. Among these methods, in the inkjet method, a liquefied material is ejected, and then cured to form a layer through irradiation with ultraviolet light (UV), cooling, or the like. According to this method, a principle of an inkjet printer can be applied, and it is thus possible to obtain an advantage of facilitating high definition.

A three-dimensional shaping device of a resin layer-lamination type ejects, onto a shaping plate, a model material that forms a final shaped object and a supporting material that supports an overhang portion of the model material and is finally removed, while performing scanning in XY-directions, and laminates the materials in a height direction to perform shaping. The model material and the supporting material are each made of a resin having characteristics of being cured by irradiation of ultraviolet light, and an ultraviolet lamp capable of emitting ultraviolet light is scanned in the XY-directions along with nozzles for ejecting the model material and the supporting material, so that the model material and the supporting material ejected from the nozzles are irradiated with ultraviolet light to be cured.

PRIOR ART DOCUMENT

Patent Document

Patent Document 1: Japanese Unexamined Patent Publication No. 2003-535712

SUMMARY OF THE INVENTION

Problems to be Solved by the Invention

However, there has conventionally been a problem in that, since a model material MA and a supporting material SA are simultaneously ejected in one scanning (X-direction) and the model material MA and the supporting material SA come into contact with each other in the uncured state as illustrated in a plan view of FIG. 9(a), both materials are mixed in an uncured liquid state at a boundary between the model material MA and the supporting material SA as illustrated in a vertical sectional view of FIG. 9(b). When curing is performed under this state, the mixed portion expands and discolors, to cause deterioration in shaping quality. Further, it makes removal of the supporting material difficult. Moreover, since the ultraviolet lamp is generally structured to be scanned along with the nozzles, it is difficult to cure the model material and the supporting material immediately after being ejected from the nozzles. For this reason, the longer the state where the materials are mixed in the uncured state continues, the more significant the foregoing problem becomes.

The present invention has been made in view of the conventional problem as described above, and a principal object thereof is to provide a three-dimensional shaping device and a three-dimensional shaping method which prevent mixture of the model material and the supporting material at a boundary surface.

Means for Solving the Problems and Effects of the Invention

In order to achieve the above object, according to a first aspect of the present invention, there is provided a three-dimensional shaping device, which repeats an operation of ejecting, onto a shaping plate 40, a model material MA that forms a final shaped object and a supporting material SA that supports an overhang portion of the model material MA and is finally removed, as shaping materials while scanning in at least one direction, and curing the shaping materials, to form slices having a predetermined thickness in a height direction, and laminates the slices in the height direction, thereby performing shaping, the device including: the shaping plate 40 for placing a shaped object thereon; shaping material ejecting means, in which a plurality of model material ejection nozzles 21 for ejecting the model material MA and a plurality of supporting material ejection nozzles 22 for ejecting the supporting material SA are arranged in one direction, curing means 24 for curing the model material MA and the supporting material SA; a head section 20 provided with the shaping material ejecting means and the curing means 24; horizontal driving means for causing the head section 20 perform reciprocating scanning in a horizontal direction; vertical driving means for moving relative positions in the height direction of the head section 20 and the shaping plate 40; control means which controls driving of the horizontal driving means and the vertical driving means and controls ejection of the shaping material by the shaping material ejecting means and curing by the curing means 24, wherein the control means can perform control such that the head section 20 is caused to perform reciprocating scanning in one direction by the horizontal driving means, the model material MA and the supporting material SA are ejected onto the shaping plate 40 by the shaping material ejecting means, and the model material MA and/or the supporting material SA are cured by the curing means 24 in at least one of forward and backward paths of the reciprocating scanning, to form the slices, and relative positions of the shaping plate 40 and the head section 20 are moved in the height direction to repeat lamination of the slices, thereby performing shaping, and on a line where the model material MA and the supporting material SA are located in a scanning direction of the shaped object, the model material MA and the supporting material SA are not simultaneously ejected during the same reciprocating scanning, but only one shaping material is ejected and cured. Accordingly, the model material and the supporting material are not simultaneously ejected during the same reciprocating scanning, but only one of the materials is ejected and cured, whereby it is possible to prevent a situation where a boundary surface between the model material and the supporting material which are adjacent to each other on the same line becomes uncured and mixed, so as to obtain an advantage of being able to clearly form the boundary surface therebetween.

Further, according to the three-dimensional shaping device in accordance with a second aspect, one shaping material of the model material MA and the supporting material SA, which is ejected and cured in one reciprocating scanning of the head section 20, and the other shaping material which is formed on the same line can be ejected and cured in a subsequent reciprocating scanning. It is thereby possible to apply, through two scannings, the shaping material in an amount corresponding to one scanning.

Further, according to the three-dimensional shaping device in accordance with a third aspect, the head section 20 ejects and cures one shaping material of the model material MA and the supporting material SA in a successive reciprocating scanning, and can thereafter eject and cure the other shaping material in a next reciprocating scanning. Therefore, the model material and the supporting material are not alternately ejected and cured, but one shaping material is successively shaped, whereby it is possible to hold the time until the other shaping material is ejected. Thus, more reliable curing can be expected, and an advantage of more reliably preventing the mixture at the boundary surface can be obtained.

Further, according to the three-dimensional shaping device in accordance with a fourth aspect, the shaping material ejecting means can perform ejection in the forward path of the one reciprocating scanning, and the curing means 24 can perform curing in the backward path of the one reciprocating scanning. It is thereby possible to perform ejection and curing of the shaping material in one reciprocating scanning.

Further, according to the three-dimensional shaping device in accordance with a fifth aspect, it is possible to provide a roller section 25 for pressing the shaping material, which has been ejected onto the shaping plate 40, in an uncured state. It is thereby possible to make the surface of the shaping material uniform before curing thereof, so as to improve the quality. It is also possible to remove an excessive portion of the shaping material.

Further, according to the three-dimensional shaping device in accordance with a sixth aspect, the roller section 25 is configured to scan the slice including the cured model material MA and the uncured supporting material SA, and the uncured supporting material SA can be ejected from the shaping material ejecting means so as to have a height higher than the cured model material MA by an amount corresponding to a predetermined offset amount. As described above, as a result of the roller section being pressed up by the cured model material by making the uncured supporting material higher than the cured model material, it is possible to prevent a situation where the cured model material comes into contact with the roller section, and thereby prevent a situation where the cured model material is scraped to cause occurrence of a failure in the roller section.

Further, according to the three-dimensional shaping device in accordance with a seventh aspect, the predetermined offset amount can be set in consideration of a distribution of positional displacement in a height direction of the roller section 25. As described above, an offset amount is set in consideration of an error of the roller section such as a displacement from circularity, an eccentricity, and variations in fixed position, whereby the roller section can appropriately set a height of the supporting material which is not in contact with the cured model material.

Further, according to the three-dimensional shaping device in accordance with an eighth aspect, the amount corresponding to the offset amount can be added to the supporting material SA located on a bottom level at each position on XY-planes of the slices successively formed on the shaping plate 40, and can be ejected from the shaping material ejecting means. Therefore, by making the height of the supporting material located on the bottom level larger, all of the supporting material and the like which are subsequently laminated thereon are made higher by an amount corresponding to the offset amount, whereby it is possible to prevent a situation where the roller section comes into contact with the cured model material as described above.

Further, according to the three-dimensional shaping device in accordance with a ninth aspect, the model material MA can be a photo-curing resin, and the curing means 24 can be light irradiation means for performing irradiation with light. It is thereby possible to facilitate curing of the model material by light. For such light, ultraviolet light and the like can preferably be used.

Further, according to the three-dimensional shaping device in accordance with a tenth aspect, the shaping material ejecting means can eject the model material MA and the supporting material SA such that the materials are spaced from each other. It is thereby possible to reliably prevent mixture of the model material and the supporting material at the boundary surface therebetween.

Further, according to an eleventh aspect of the present invention, there is provided a three-dimensional shaping method, which repeats an operation of ejecting, onto a shaping plate 40 for placing a shaped object thereon, a model material MA that forms a final shaped object and a supporting material SA that supports an overhang portion of the model material MA, and is finally removed, as shaping materials while scanning in at least one direction, and curing the shaping materials, to form slices having a predetermined thickness in a height direction, and laminates the slices in the height direction, thereby performing shaping, the method can include the steps of ejecting one shaping material of the model material MA and the supporting material SA onto the shaping plate 40 by shaping material ejecting means for ejecting the shaping material; curing the one ejected shaping material by curing means 24 for curing the shaping material; ejecting the other shaping material of the model material MA and the supporting material SA, which has not been ejected, onto the shaping plate 40 by the shaping material ejecting means; curing the other shaping material by the curing means 24; and forming the slices by the cured model material MA or the cured supporting material SA, and then moving relative positions of the shaping plate 40 and a head section 20 in a height direction to repeat lamination of the slices. Therefore, any one of the model material and the supporting material is cured and the other is thereafter ejected, to allow individual curing, whereby it is possible to obtain an advantage of being able to efficiently prevent mixture of the model material and the supporting material at the boundary surface therebetween.

Further, according to a twelfth aspect of the present invention, there is provided a three-dimensional shaping program, which repeats an operation of ejecting, onto a shaping plate 40 for placing a shaped object thereon, a model material MA that forms a final shaped object and a supporting material SA that supports an overhang portion of the model material MA, and is finally removed, as shaping materials while scanning in at least one direction, and curing the shaping materials, to form slices having a predetermined thickness in a height direction, and laminates the slices in the height direction, thereby performing shaping, the program can cause a computer realize the functions of ejecting one shaping material of the model material MA and the supporting material SA onto the shaping plate 40 by shaping material ejecting means for ejecting the shaping material; curing the one ejected shaping material by curing means 24 for curing the shaping material; ejecting the other shaping material of the model material MA and the supporting material SA, which has not been ejected, onto the shaping plate 40 by the shaping material ejecting means; curing the other shaping material by the curing means 24; and forming the slices by the cured model material MA or the cured supporting material SA, and then moving relative positions of the shaping plate 40 and a head section 20 in a height direction to repeat lamination of the slices. Therefore, any one of the model material and the supporting material is cured and the other is thereafter ejected, to allow individual curing, whereby it is possible to obtain an advantage of being able to efficiently prevent mixture of the model material and the supporting material at the boundary surface therebetween.

Further, according to a thirteenth aspect of the present invention, there is provided a computer-readable recording medium that stores the above program Examples of the recording medium include: magnetic disks, optical disks, magneto-optical disks, semiconductor memories, and other mediums capable of storing programs, such as CD-ROMs, CD-Rs, CD-RWs, flexible disks, magnetic tapes, MOs, DVD-ROMs, DVD-RAMS, DVD-Rs, DVD+Rs, DVD-RWs, DVD+RWs, Blu-rays, and HD DVDs (AODs). Further, the program includes one in the form of being distributed by downloading through a network such as the Internet, other than one stored into the recording medium and distributed. Moreover, the recording medium includes equipment capable of recording the program, e.g., general-purpose or dedicated equipment mounted with the program in the form of software, firmware, or the like, in an executable state. Furthermore, each process and each function included in the program may be executed by program software which is executable by the computer, or the process of each section may be realized in a form where hardware such as a predetermined gate array (FPGA, ASIC) or by combinations of program software and a partial hardware module that realizes part of an element of hardware.

MODES FOR CARRYING OUT THE INVENTION

Figure 1:
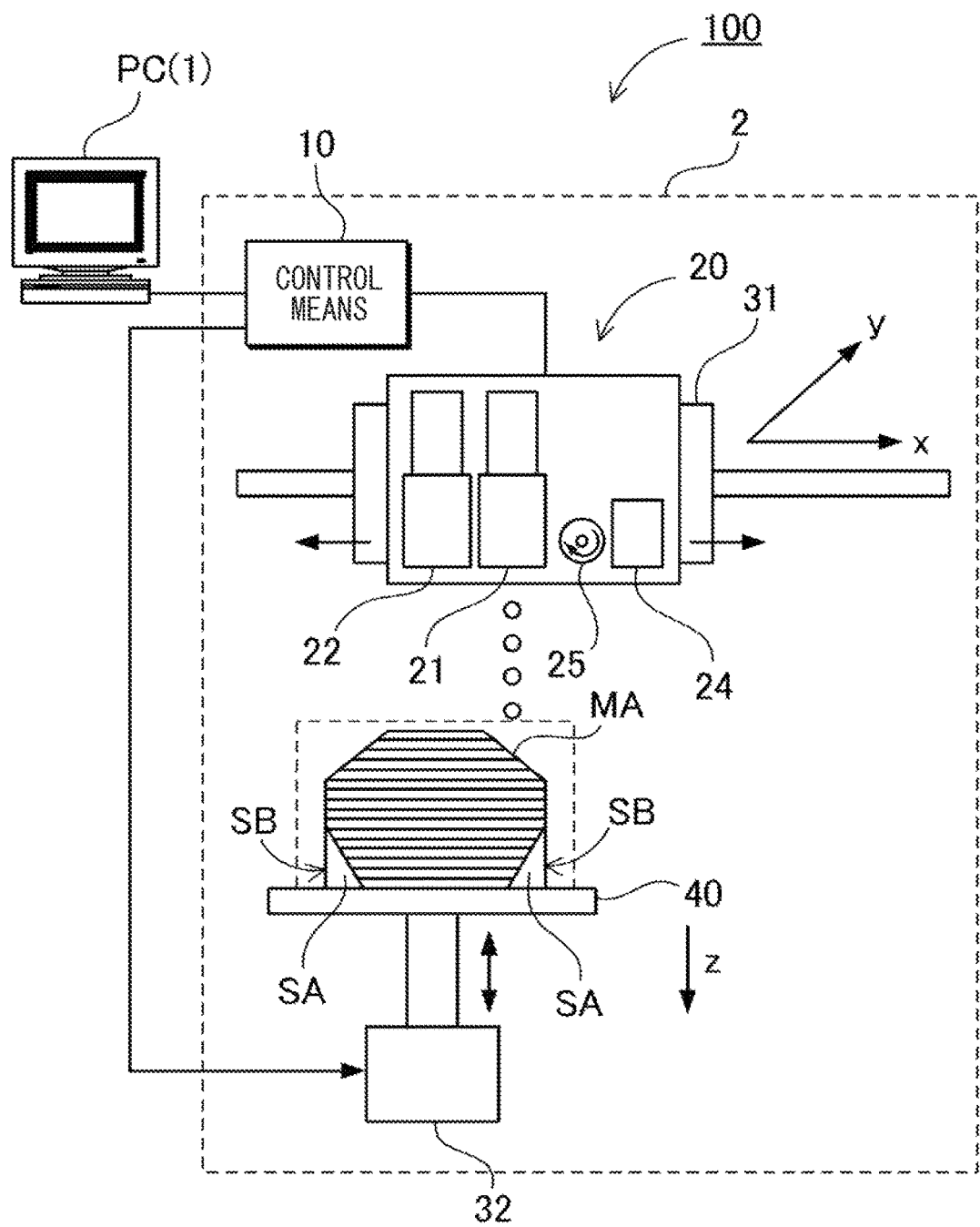
FIG. 1 is a block diagram illustrating a three-dimensional shaping device according to a first embodiment.

Hereinafter, embodiments of the present invention will be described. However, the embodiments shown below only illustrate a three-dimensional shaping device and a three-dimensional shaping method for making a technical concept of the present invention concrete, and the present invention is not limited to the three-dimensional shaping device and the three-dimensional shaping method described below. Further, the present specification will not specify members described in the claims to members of the embodiments. Especially, sizes, materials, shapes, relative depositions, and the like of components described in the embodiments are not intended to restrict the scope of the present invention, but are mere explanatory examples. It is to be noted that sizes, positional relations, and the like of the members illustrated in the drawings may be exaggerated for clarifying the description. Further, in the following description, the same designation and symbol denote an identical member or a member of the same quality, and a detailed description thereof will be omitted as appropriate. Moreover, each element constituting the present invention may be in a mode where a plurality of elements are configured by the same member and one member may serve as the plurality of elements, or conversely, a function of one member can be shared and realized by a plurality of members.

The three-dimensional shaping device used in the embodiments of the present invention is electrically, magnetically, or optically connected to a computer, a printer, an external storing device, and other peripheral apparatuses for performing operations, control, display, and other processes, through serial connections or parallel connections such as IEEE1394, RS-232x, RS-422, RS-423, RS-485, UBSs, and the like or through networks such as 10BASE-T, 100BASE-TX, and 1000BASE-T. The connection is not limited to physical wired connection, but may be wireless connection through use of radio waves, infrared rays, optical communication, and the like, for example, wireless LAN such as IEEE802.1x, and Bluetooth (registered trademark). Further, as for the recording medium for performing exchange of data, storage of setting, and the like, a memory card, a magnetic disk, an optical disk, an magneto-optical disk, a semiconductor memory, and the like can be used. In the present specification, the three-dimensional shaping device is used by the meaning including not only a main body of the three-dimensional shaping device, but also a three-dimensional shaping system formed by combining therewith peripheral apparatuses such as a computer and an external storage device.

Further, in the present specification, the three-dimensional shaping device, the three-dimensional shaping method, and the three-dimensional shaping program are not limited to a system for performing three-dimensional shaping itself, and a device and a method for performing, in hardware, inputting/outputting, display, computing, communication, and other processes related to image formation. The device and the method for realizing processes in software are also included in the scope of the present invention. For example, a device and a system, where a program, a plug-in, an object, a library, an applet, a compiler, a module, a macro that operates on a specific program, and the like are incorporated into a general-purpose circuit or computer, to enable image formation and a process related thereto, also correspond to the three-dimensional shaping device, the three-dimensional shaping method, and the three-dimensional shaping program of the present invention and a recording medium readable by a computer. Further, in the present specification, in addition to a general-purpose or dedicated electronic calculator, the computer includes a work station, a terminal, mobile electronic equipment, mobile phones such as PDC, CDMA, W-CDMA, FOMA (registered trademark), GSM, IMT2000, and a fourth-generation mobile phone, PHS, PDA, a pager, a smart phone, and some other electronic devices. Moreover, in the present specification, the program is not limited to those used solely, but may be used in the mode of functioning as part of a special computer program, software, service, or the like, the mode of functioning by being called at the time of need, the mode of being provided as a service in an environment of an OS or the like, the mode of operating while being resident in the environment, or the mode of operating in the background, or used in a position as the other support program.

First Embodiment

FIG. 1 illustrates a block diagram of a three-dimensional shaping system 100 according to a first embodiment of the present invention. The three-dimensional shaping system 100 ejects shaping materials in a liquid or a fluid state in an inkjet manner, cures the ejected materials, and then laminates the shaping materials to form an arbitrary shaped object. As the shaping materials, there are used a model material MA that forms a final shaped object, and a supporting material SA that is at least shaped for supporting an overhang portion of the model material MA, from below in a Z-direction, and is finally removed.

The three-dimensional shaping system 100 illustrated in FIG. 1 is configured by a set data creating device 1 (computer PC in FIG. 1) that transmits set data to a three-dimensional shaping device 2, and the three-dimensional shaping device 2. The three-dimensional shaping device 2 is provided with control means 10, a head section 20, and a shaping plate 40. The head section 20 is provided with, as shaping material ejecting means, a model material ejection nozzle 21 that ejects the model material MA and a supporting material ejection nozzle 22 that ejects the supporting material SA. Further, the head section 20 is also provided with a roller section 25 for scraping off an excessive portion from these ejected shaping materials to smooth the surface of the shaping materials, and curing means 24 for curing the shaping material. Moreover, there are also provided an XY-direction driving section 31 and a Z-direction driving section 32 as horizontal driving means for causing the head section 20 perform reciprocating scanning in an X-direction and perform scanning in a Y-direction orthogonal to the X-direction in a horizontal direction in order that the shaping materials in a liquid or fluid state are ejected from the model material ejection nozzle 21 and the supporting material ejection nozzle 22 in an inkjet manner onto appropriate positions on the shaping plate 40, and as vertical driving means for moving relative positions in a height direction of the head section 20 and the shaping plate 40.

Upon receipt of an input of a shaped object in a three-dimensional shape, such as model data designed by a three-dimensional CAD or the like, the computer PC functions as the set data creating device 1 which first converts this CAD data to, e.g., STL data, further generates cross-section data obtained by slicing this STL data into a plurality of thin cross-sectional bodies, and transmits this slice data in a batch or in units of each sliced layer to the three-dimensional shaping device 2. At this time, associated with decision of a posture of the model data (actually, STL data after the conversion) designed by the three-dimensional CAD or the like on the shaping plate 40, a position to be provided with the supporting material SA is set with respect to a space or a place required for supporting a model formed by the model material in this posture, and based on this data, slice data corresponding to each layer is formed. The control means 10 captures the cross-section data from the computer PC, and controls the head section 20, the XY-direction driving section 31, and the Z-direction driving section 32 in accordance with the data. By this control of the control means 10, the XY-direction driving section 31 operates, and the model material MA and the supporting material SA as the shaping materials are also ejected as droplets from the model material ejection nozzle 21 and the supporting material ejection nozzle 22 of the head section 20 onto appropriate positions on the shaping plate 40, to thereby perform shaping with a cross sectional shape based on the cross-section data provided from the computer PC. The model material MA as one of the shaping materials ejected onto the shaping plate 40 is at least cured, so that the model material MA is changed from the liquid or the fluid state to a solid, and thus, is cured. By such an operation, the cross-sectional body corresponding to one layer, namely, a slice, is formed.

(Slice)

Herein, "slice" refers to a lamination unit in the Z-direction of the shaped object, and the number of slices is a value obtained by dividing a height by a lamination thickness. Actually, as requirements for determining the thickness of each slice, a settable minimum thickness of the slice is determined by a minimum unit amount of ejection that can be ejected from each ejection nozzle, variations in the roller section 25 due to eccentricity in the vertical direction of the roller, and the like. The value which was set based on such a viewpoint is obtained as the minimum value of the slice, and the user can finally determine each slice amount from the viewpoint of, for example, required shaping accuracy and shaping speed. That is, when selecting to give priority to the shaping accuracy, the user can determine each slice amount based on the foregoing slice minimum value or a value in the vicinity thereof, and on the other hand, when giving priority to the shaping speed, the user can determine each slice amount, with which the minimum shaping accuracy is held. Further, as other methods, there is a method of causing the user to sensuously select a ratio between the shaping accuracy and the shaping speed, or causing the user to input allowable maximum shaping time, to thereby display several combinations between the shaping time and the shaping accuracy as candidates and then causing a user to select a preferable condition out of these candidates.

Moreover, shaping actions for one slice data is performed in such a manner that the shaping materials in the liquid or fluid state are ejected from the model material ejection nozzle 21 and the supporting material ejection nozzle 22 in the inkjet manner in at least one of forward or backward path at the time of at least performing reciprocating operation of the head section 20 in the X-direction, and the roller section 25 is functioned so as to smooth the surface of the uncured shaped object ejected onto the shaping plate 40 in the uncured state in at least one of the forward or backward path, while the surface of the smoothed shaped object is irradiated with light having a specific wavelength from the curing means 24, to thereby perform a series of steps for curing the shaped object at least once, but it goes without saying that the number of times these steps are performed is automatically changed by the thickness of the slice data or the required shaping accuracy.

Meanwhile, the maximum thickness which can be formed on the shaping plate through a single ejection from the model material ejection nozzle 21 and the supporting material ejection nozzle 22 in at least the forward or backward path, is determined based on a unit amount of ejection, with which the cross-sectional shape of the ejected droplet after reaching the plate can be held substantially circular.

(Shaping Plate 40)

The shaping plate 40 can be moved up and down freely by the Z-direction driving section 32. When one slice is formed, the Z-direction driving section 32 is controlled by the control means 10, and the shaping plate 40 moves down just by a distance corresponding to the thickness of one slice. Then, by repetition of such an operation similar to the above, a new slice is laminated on the top side (top surface) of the first slice. Multi-layers of thin slices successively made as described above are laminated, to shape a shaped object.

Further in the case of a so-called overhang shape where the shaped object protrudes, the computer PC adds an overhang-supporting section shape to the shaped object as required, when the computer PC converts the shaped object into data. Then, simultaneously with shaping of the model material MA constituting the final shaped object, the control means 10 shapes an overhung supporting section SB based on the shape of the overhung supporting section. Specifically, the supporting material SA which is different from the model material MA is ejected as droplets from the supporting material ejection nozzle 22, to thereby form the overhung supporting section SB. After the shaping, the supporting material SA which constitutes the overhung supporting section SB is removed, to thereby obtain a target three-dimensional shaped object.

Figure 3:
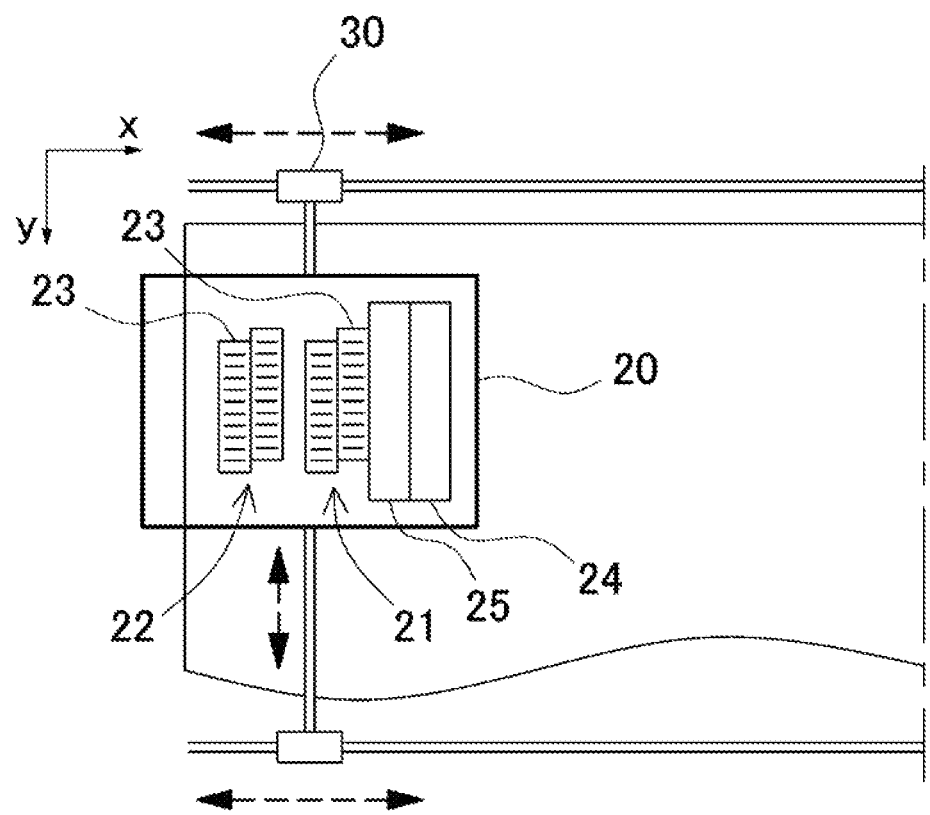
FIG. 3 is a plan view illustrating a state where a head section is moved in XY-directions.

As illustrated in the plan view of FIG. 3, the head section 20 is moved by head moving means 30 in horizontal directions, namely, in XY-directions. Further, as illustrated in FIG. 1, the shaping plate 40 is moved by plate raising/lowering means (Z-direction driving section 32) in the height direction, namely, the Z-direction. This allows a change in relative heights of the head section 20 and the shaping plate 40, so as to enable stereoscopic shaping. More specifically, first, the head section 20 is reciprocatingly operated by the head moving means 30 in the X-direction in order to eject the model material MA and the supporting material SA as the shaping materials from the model material ejection nozzle 21 and the supporting material ejection nozzle 22 to appropriate portions based on the slice data, and the model material MA and the supporting material SA are ejected from a plurality of orifices respectively provided in the respective ejection nozzles 21, 22 and extending in the Y-direction. Further, as illustrated in FIG. 3, in a case where widths of the respective ejection nozzles 21, 22 in the Y-direction are smaller than a width in the Y-direction with which shaping is possible on the shaping plate 40, as well as a case where a width of the model data for shaping in the Y-direction is larger than a total length of the orifice extending in the Y-direction, after the respective ejection nozzles 21, 22 are reciprocatingly operated in the X-direction in predetermined positions, the respective ejection nozzles 21, 22 are shifted in a predetermined amount in the Y-direction, and while reciprocating scanning is performed in the X-direction in those positions, the model material MA and the supporting material SA are repeatedly ejected onto appropriate positions based on the slice data, to thereby form a shaped object corresponding to all the set shaping data.

Figure 2:
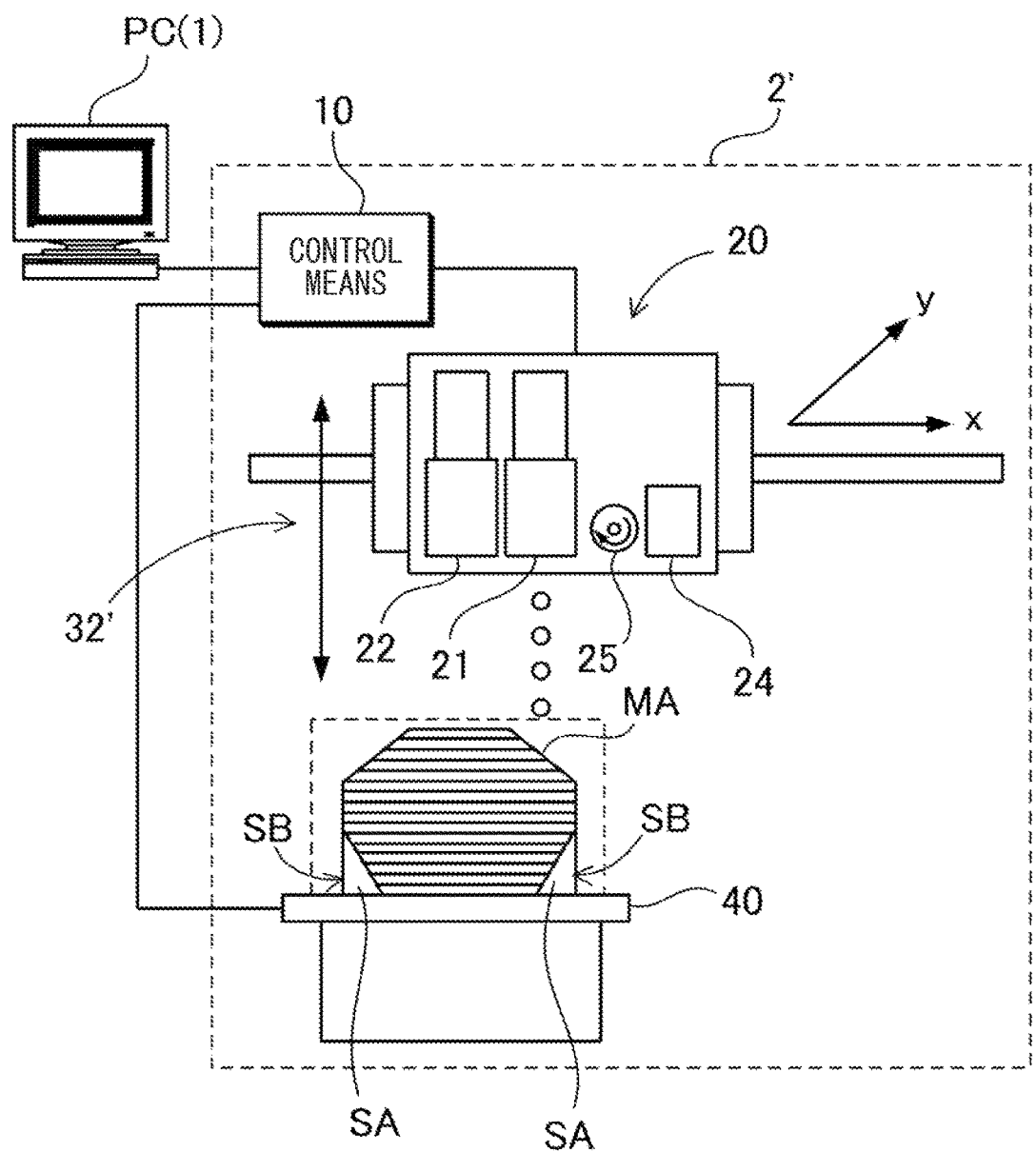
FIG. 2 is a block diagram illustrating a three-dimensional shaping device according to a modified example.

Although the plate raising/lowering means for raising and lowering the shaping plate 40 has been used as the Z-direction driving section 32 in the example of FIG. 1, the present invention is not limited to this example, and as in a three-dimensional shaping device 2' illustrated FIG. 2, the shaping plate 40 side can be fixed in the height direction, to adopt a Z-direction driving section 32' for moving the head section side in the Z-direction. Further, as for movement in the XY-directions, the head section side may be fixed and the shaping plate side may be moved. Moreover, the shift of the head section 20 in the Y-direction as described above is not required when the width of each nozzle is made substantially the same as the width of the shaping plate 40 in the Y-direction with which shaping is possible. However, even in such a case, for the purpose of enhancing resolution of the shaped object in the Y-direction which is determined based on intervals between the orifices provided in the nozzles, each orifice may be shifted so as to be located between the orifices at the time of previous shaping by the head section 20 being shifted in the Y-direction.

(Control Means 10)

The control means 10 controls the pattern of ejecting the shaping materials. That is, while the model material MA and the supporting material SA are ejected onto the shaping plate 40 by the shaping material ejecting means in at least one of the forward and backward paths out of the reciprocating scanning in the X-direction, the head section 20 is made to perform reciprocating scanning in one direction and the shaping material is ejected by the shaping material ejecting means onto the shaping plate, and thereafter the model material MA and the supporting material SA are cured by the curing means 24 in at least any one of the forward and backward paths, to thereby form a slice, and relative positions of the shaping plate 40 and the head section 20 are moved in the height direction to repeat lamination of the slices, thus performing shaping. Although described in detail later, smoothing of the shaping material surface by the roller section 25 is performed in at least any one of the forward and backward paths after the shaping material has been ejected onto the shaping plate 40 by the shaping material ejecting means and before the surface of the shaping material is cured by the curing means 24.

With this control means 10, any one of the model material MA and the supporting material SA is ejected in one reciprocating scanning, and the shaping material surface is smoothed by the roller section 25 and further cured by the curing means 24. Then, the other shaping material, which has not been ejected, is ejected in a subsequent reciprocating scanning, and the shaping material surface is smoothed and cured. This series of processes is performed at least once, to form one slice. Needless to say, above series of processes corresponding to a layer of slice data are repeated a plurality of times in accordance, for example, with the surface accuracy and shaping time of the final model requested by the user. Therefore, the surface of any one of the model material MA and the supporting material SA, which is in an uncured state, is smoothed and cured, and thereafter, the other one of the materials is ejected, to allow individual curing. Accordingly, it is possible to obtain an advantage of being able to efficiently prevent mixture of the model material MA and the supporting material SA at the boundary surface therebetween.

(Shaping Material)

Figure 4:
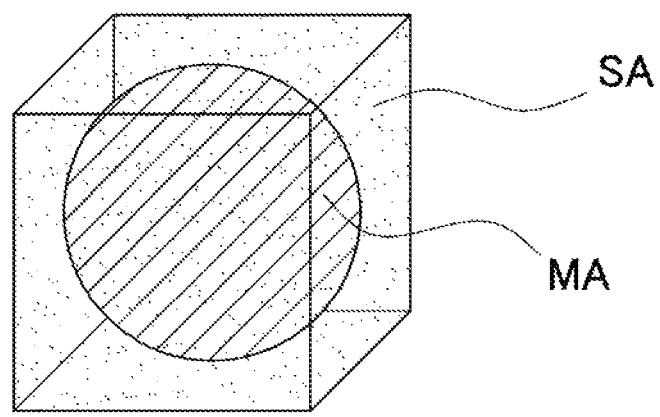
FIG. 4 is a perspective view illustrating a shaped object formed by shaping a model material and a supporting material.
Figure 5:
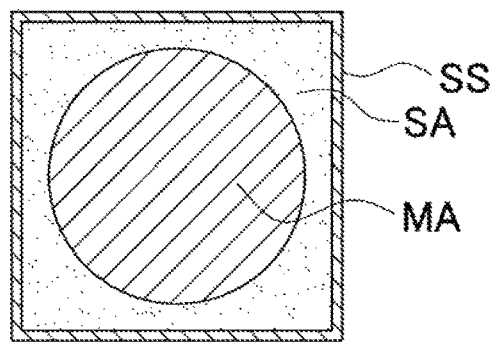
FIG. 5 is a sectional view of FIG. 4.

As described above, the model material MA that forms the final shaped object, and the supporting material SA that supports the overhang portion of the model material MA and is finally removed, are used for the shaped objects. FIG. 4 illustrates a perspective view of a shaped object shaped such that a periphery of the spherical-shaped model material MA is covered by the supporting material SA in the shape of a rectangular cuboid, and FIG. 5 illustrates a sectional view of the same.

(Curing Means 24)

A photo-curing resin such as an ultraviolet curing resin can be used for the model material MA. In this case, the curing means 24 is light irradiation means for performing irradiation with light that includes a specific wavelength to be reacted with at least the material for the model material MA to cause curing and is, for example, ultraviolet light irradiation means such as an ultraviolet lamp. As the ultraviolet lamp, there can be used a halogen lamp, a mercury lamp, an LED, and the like. Further, in this example, the ultraviolet curing resin is used also as the supporting material. In the case of using the ultraviolet curing resin that is cured by ultraviolet light with the same wavelength, the same ultraviolet irradiation means can be used so as to obtain an advantage of being able to share the light source.

(Model Material MA)

Further, a thermoplastic resin can also be used as the model material. In this case, the curing means 24 serves as cooling means. In the case of employing thermoplastic resins as both the model material and the supporting material, by employing, as the model material, one having a melting point higher than the melting point of the supporting material, it is possible to remove the supporting material through melting, by heating the shaped object after the completion of layer laminations to a temperature higher than the melting point of the supporting material and lower than the melting point of the model material, and then maintaining the temperature thereof. Moreover, one of the model material and the supporting material may be the photocuring resin, and the other may be the thermoplastic resin.

Alternatively, a material which is curable through chemical reaction with the curing material can also be used as the model material. Further, the model material can be mixed with a liquid reforming agent as necessary in order to adjust spray characteristics such as viscosity and surface tension. Moreover, the spray characteristics can be changed by temperature adjustment. Other examples of the model material include an ultraviolet photopolymer, an epoxy resin, an acryl resin, and urethane.

(Supporting Material SA)

As for the supporting material SA, a water-swellable gel, wax, a thermoplastic resin, a water-soluble material, a meltable material, and the like can be used as a removable material. For removal of the supporting material SA, methods of dynamic cleanings such as solution with water, heating, chemical reactions, and hydraulic cleaning, separations utilizing thermal expansion differences through melting by irradiation of electromagnetic waves can be used as appropriate in accordance with properties of the supporting material.

Since the supporting material is finally removed, it is required to have characteristics of being easy to remove. For example, a water-soluble supporting material is put into a water bath after the shaped object has been shaped, and hence the supporting material can be dissolved and removed. Meanwhile, when the supporting material has higher solubility, the supporting material has a lower strength, and thus, when humidity is high, the supporting material is prone to deliquesce to lose its shape, drop, and the like. If the supporting material has insufficient rigidity, its ability to support the model material is degraded, which may make it hard to shape the model material on the upper surface of the supporting material, thereby degrading the accuracy of the model material. On the other hand, if the supporting material has increased rigidity, this increases the difficulty of dissolving the supporting material into water when the supporting material is removed from the final shaped object, and the removal takes time. Since the supporting material is required to exhibit inconsistent properties as described above, it has been conventionally difficult to provide a supporting material capable of exhibiting optimum properties.

In the case of, for example, using a water-soluble material as the supporting material as in the present embodiment, it is possible to form a supporting shell SS as an outer shell of the supporting material SA, which can inhibit the supporting material from directly contacting with air as much as possible during shaping of the model with the shaping device, thereby inhibiting the supporting material from absorbing moisture in air. This prevents deformation of the supporting material, and also, prevents deformation of the model material due to deformation of the supporting material during shaping. Further, by forming the supporting shell SS, it is possible to inhibit the supporting material inside thereof from absorbing the moisture in the air, which can improve the water-solubility performance of the supporting material. As a result, it is possible to increase the speed of dissolution of the supporting material, when the supporting material is immersed into a solution such as water for removal thereof. With this configuration, it is possible to enable the supporting material to have sufficient rigidity, while increasing the speed of dissolution thereof since the supporting shell SS as the outermost shell is broken during removal thereof, thereby offering the advantage of reduction of the time period required for removal of the supporting material. In the examples of FIGS. 4 and 5, the supporting shell SS formed on the surfaces of the rectangular parallelepiped shape is broken, in order to remove the supporting material SA inside thereof.

(Details of Supporting Material SA)

The supporting material SA contains a noncurable component. Especially, by enhancing the solubility, the supporting material can be dissolved and removed in a short period of time after being put into the water bath. The solubility of the supporting material is not limited to water-solubility, but may be solubility in a specific solvent. Meanwhile, since such a supporting material is in a liquid state or a gel state, it is sticky or slimy when touched by a hand, and the hand tends to get dirty. For this reason, as described above, the supporting shell SS is provided on the surface of the supporting material for protection.

(Supporting Shell SS)

The supporting shell SS provided on the outer surface of the supporting material SA is formed from the model material MA which has higher rigidity than that of the supporting material SA. In such a manner, it is possible to enhance the rigidity of the surface of the supporting material SA and prevent outflow of the supporting material SA. In the present embodiment, since the supporting shell SS is formed from the model material MA ejected from the model material ejection nozzle 21, the model material ejection nozzle 21 of the head section 20 can be shared as an ejection nozzle for the supporting shell SS, and the supporting shell SS of the supporting material SA can also be shaped at the time of shaping the model material MA, which is also advantageous in terms of cost and speed. Specifically, at the time of generating three-dimensional shaping data for at least the model material MA and the supporting material SA, the shaping data is generated such that, with respect to positions where the outer surface is to be formed from the supporting material in the shaping data, the supporting material located at the outer surface is automatically changed to the model material or a thin-film layer formed of the model material is formed to cover the outer surface of the supporting material. The control means 10 then controls the shaping material ejecting means such that the model material MA is ejected onto a position, where the supporting shell SS is formed on the outer surface of the supporting material SA at the time of forming each slice corresponding to the generated data, and cured and the outer surface of the supporting material SA is thus covered by the thin model material MA. Hence, forming the thin model material MA on the surface of the supporting material SA can give an advantage of being able to facilitate formation of the supporting shell SS. In addition, from the viewpoint of a balance between the ease of removal and the ensuring of the strength, the thickness of the thin film formed by this model material is considered to be preferably about 0.1 mm to 5 mm. Further, although the supporting shell SS has been formed by the model material MA ejected from the model material ejection nozzle 21 in the present embodiment, it is also possible to form a supporting shell using an additionally-provided nozzle for ejecting a material different from the model material MA, provided that this material exhibits appropriate characteristics as the supporting shell. At this time, regarding the characteristics of the material of the supporting shell, the material of the supporting shell is preferably a material having higher hardness than that of the model material MA and also having lower tenacity than that of the model material MA, in view of striking a balance between the ease of removal and the ensuring of the strength on a higher level.

(Peeling Structure of Support Shell SS)

On the other hand, in the configuration where the supporting shell SS is provided in the supporting material SA, the higher the rigidity of the supporting shell SS, the more difficult to peel the supporting shell SS from the shaping material. Hence it is preferable to add a structure to facilitate peeling of the supporting shell SS. Specifically, the entire surface of the supporting material SA is not covered by the supporting shell SS, but an exposed portion is provided in which the supporting material SA is partially exposed. This makes it easy to break the supporting shell SS at the exposed portion after shaping of the shaped object. Further, when a soluble material is used for the supporting material SA, the supporting material SA can be immersed in a liquid and dissolved from the exposed portion after shaping of the shaped object. It is thus possible to peel the supporting shell SS from the shaped object without breaking it, so as to obtain an advantage of being able to save labor in operation of removing the supporting material SA. Moreover, only the outer peripheral section of the continued outer surface where the supporting shell SS should be formed is formed into a thick shape as compared with the other outer surface where the supporting shell SS is formed, whereby the continued outer surface where the supporting shell SS is formed can be made easy to peel integrally.

(Head Section 20)

Figure 6:
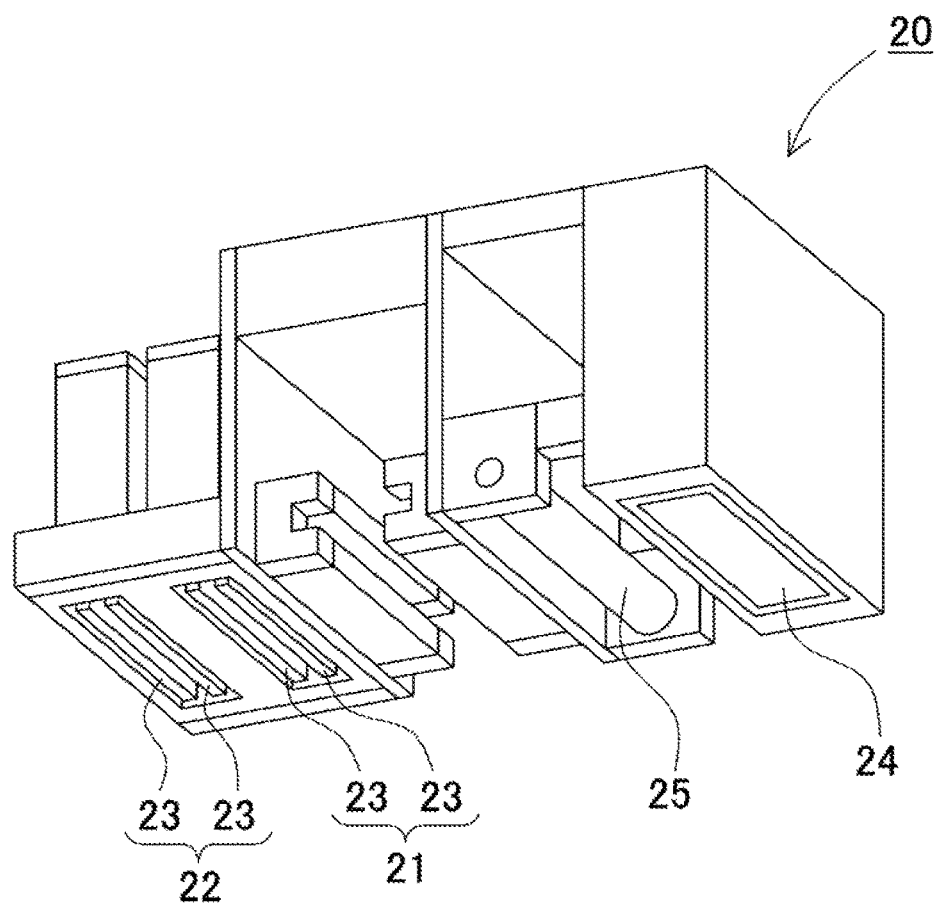
FIG. 6 is a perspective view illustrating an appearance of the head section.
Figure 7:
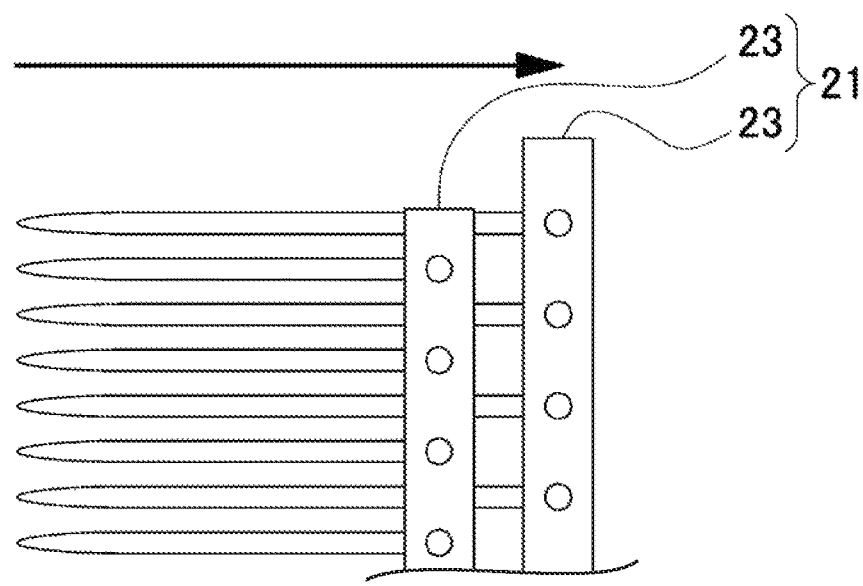
FIG. 7 is a plan view illustrating a state where the shaping material is ejected by the head section of the FIG. 6.

FIG. 6 illustrates an example of the head section 20 of the inkjet-type three-dimensional shaping device. The head section 20 illustrated in the figure includes, as the shaping material ejecting means, dedicated ejection nozzles that individually eject the model material MA and the supporting material SA. Specifically, the model material ejection nozzle 21 for ejecting the model material MA, and the supporting material ejection nozzle 22 for ejecting the supporting material SA are provided spaced from each other in parallel. Each ejection nozzle is provided with two nozzle rows 23, and these nozzle rows 23 are arranged displaced from each other by a distance corresponding to half a nozzle, as illustrated in the plan view of FIG. 7, to thereby improve resolution. Further, each nozzle row 23 arranged in an offset state is arranged such that respective corresponding lines in the model material ejection nozzle 21 and the supporting material ejection nozzle 22 conform to the same lines, to thereby make resolution consistent between the model material and the supporting material.

In the head section 20, the supporting material ejection nozzle 22, the model material ejection nozzle 21, the roller section 25, and the curing means 24 are integrally provided from the left. Each ejection nozzle ejects an ink-type shaping material in the manner of piezoelectric-device type ink-jet printing head. Further, the shaping material is adjusted to have such a viscosity that it can be ejected from the ejection nozzle.

In the example of FIG. 6, the head section 20 first ejects the model material MA, and then ejects the supporting material SA. Further, the head section 20 ejects the shaping material in the forward path (from left to right in the figure), and the curing means 24 cures the ejected shaping material in the backward path (from right to left in the figure).

(Roller Section 25)

Figure 8:
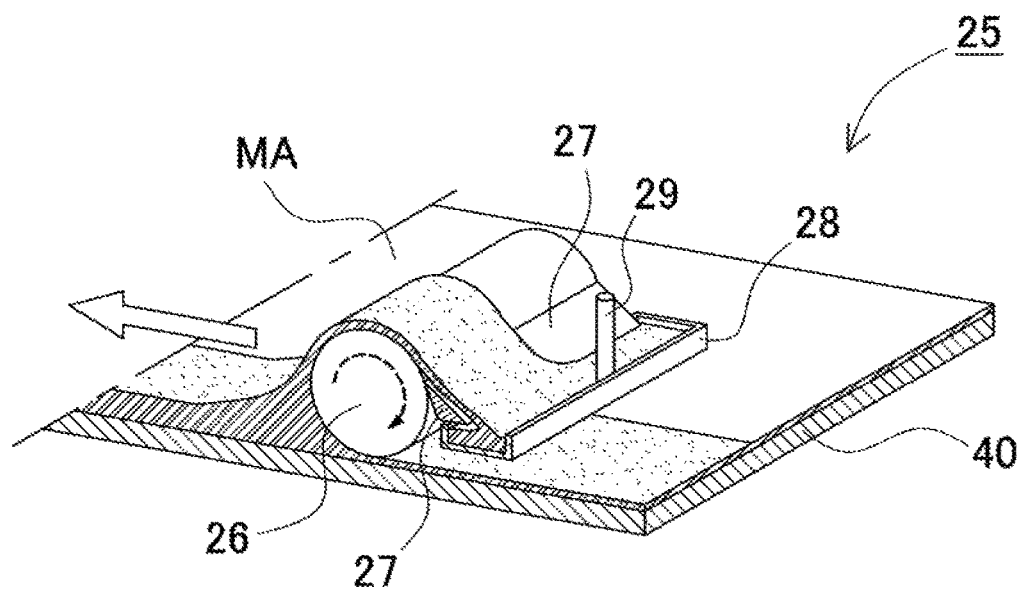
FIG. 8 is a perspective view illustrating a state where an excessive portion of the shaping material is removed by a roller section.

The head section 20 is further provided with the roller section 25 for pressing the surfaces of the ejected model material MA and the supporting material SA in an uncured state to remove an excessive portion of the shaping material so as to smooth the shaping material surface. The state of an operation of the roller section 25 is described based on a schematic view of FIG. 8. This example shows a state where the surface of the ejected model material MA in the uncured state is leveled by a roller body 26. The roller section 25 is provided with the roller body 26 as a rotating body, a blade 27 arranged so as to protrude from the surface of the roller body 26, a bath 28 that stores the shaping material scraped off by the blade 27, and a suction pipe 29 that ejects the shaping material stored in the bath 28. The roller body 26 is rotated in a reverse direction (clockwise in FIG. 8) to a traveling direction of the head section 20, to scrape off the uncured shaping material. The scraped shaping material is attached to the roller body 26 and carried to the blade 27, and it is then scraped off by the blade 27 and guided to the bath 28. For this reason, the blade 27 is fixed in a posture inclined downwardly toward the bath 28. Further, the suction pipe 29 is connected to the pump, and the shaping material stored in the bath 28 is sucked and ejected. In this example, the roller body 26 is made to have an outer shape with a diameter $\phi$ of about $\phi$20 mm and a rotational speed of about 10 rps.

The roller section 25 performs scraping at the time of the head section 20 traveling from right to left in the figure. In other words, when the model material MA and the supporting material SA are ejected respectively from the model material ejection nozzle 21 and the supporting material ejection nozzle 22 onto appropriate positions based on slice data while the head section 20 travels from left to right, neither does the roller section 25 come into contact with the shaping material nor is lighting performed from a light source of the curing means 24. After at least the respective nozzles 21 and 22 are caused to eject the shaping materials, for example, in the forward path in the direction of left-to-right main scanning of the head section 20 in the figure, the roller section 25 performs the foregoing scraping operation, and the curing device 24 operates as a light source which emits light for curing at least the model material MA in the backward path in the direction of right-to-left main scanning.

As illustrated in FIGS. 1 and 6, with respect to the traveling direction of the head section 20, the roller section 25 is arranged in front of the curing means 24, and on the left side in the figure. As a result, the uncured shaping material is scraped off by the roller section 25 in advance, and thereafter, the curing means 24 cures the shaping material. With such an arrangement, it is possible to scrape off and cure the shaping material using the same path, so as to obtain an advantage of being able to efficiently perform processing.

(Individual Curing on Boundary Surface)

This three dimensional shaping device individually cures the model material MA and the supporting material SA in order to prevent mixture of the model material MA and the supporting material SA on a boundary portion thereof. For this reason, the control means 10 sets ejection patterns of the model material MA and supporting material SA. Hereinafter, procedures thereof will be described based on plan views and vertical sectional views illustrating ejection patterns in FIGS. 9 to 15. In each of these figures, for convenience of description, an example will be described where one line of the model material MA and one line of the supporting material SA are ejected in one reciprocating scanning. Further, the model material MA is indicated by diagonal lines, and the supporting material SA is indicated by a solid color. Moreover, the sequence of reciprocating scannings is indicated by numbers.

Conventionally, as illustrated in FIG. 9(a), the model material MA and the supporting material are ejected during the same reciprocating scanning. For this reason, two lines can be formed by two reciprocating scannings. On the other hand, as illustrated in FIG. 9(b), since a boundary portion of the model material MA and the supporting material SA come into contact with each other at the boundary portion therebetween in a state where the materials have not been cured, which causes mixture of the materials at the boundary surface, thereby inducing the problem of degradation of the quality at the boundary surface.

Figure 10:
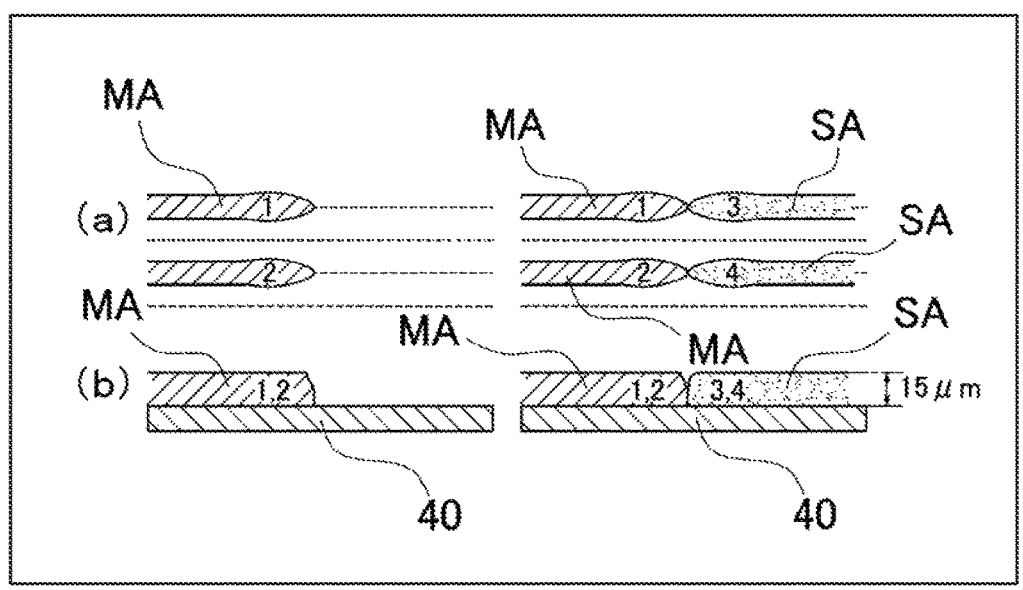
FIG. 10($a$) is a plan view and FIG. 10($b$) is a vertical sectional view illustrating an ejection pattern according to the first embodiment.

As opposed to this, as illustrated in FIG. 10, the three-dimensional shaping device according to the first embodiment ejects and cures only one of the shaping materials, that is, only the model material MA in an example illustrated in FIG. 10(a), while not ejecting the supporting material SA. Further, the three-dimensional shaping device ejects and cures only the supporting material SA, during another reciprocating scanning. As described above, both the model material MA and the supporting material SA are not ejected and cured during the same reciprocating scanning, and the model material MA and the supporting material SA are ejected and cured during respective different scannings, which can prevent contact between the model material MA and the supporting material SA which have not been cured. More specifically, in this embodiment, the model material MA is ejected to have a predetermined first thickness, and thereafter, in a state where the model material MA has not been cured, the roller section 25 provided in the head section 20 is caused to scrape off excessive portion of the material for smoothing the model material MA in at least one forward or backward path which is different from at least one forward or backward path in which the model material MA is ejected, thereby ensuring that the model material MA has a second thickness smaller than the first thickness described above. Further, the curing means 24 is caused to cure the model material MA having been ejected onto the shaping plate 40, in at least one forward or backward path which is the same path as that for the smoothing operation of the roller section 25 or in at least one forward or backward path after that for the smoothing operation of the roller section 25. Then, after the processing for curing the model material MA having been ejected in advance, the supporting material SA is ejected to have a predetermined third thickness larger than the predetermined second thickness of the model material, and thereafter, in a state where the supporting material SA has not been cured, the roller section 25 provided in the head section 20 is caused to scrape off excessive portion of the material for smoothing the supporting material SA in at least one forward or backward path which is different from at least one forward or backward path in which the supporting material SA is ejected, thereby ensuring that the supporting material SA has a fourth thickness which is substantially equal to or larger than the second thickness of the model material but smaller than the third thickness of the supporting material SA. Further, the curing device 24 is caused to cure the supporting material SA having been ejected onto the shaping plate 40, in at least one forward or backward path which is the same path as that for the smoothing operation of the roller section 25 or in at least one forward or backward path after that for the smoothing operation of the roller section 25.

That is, a first material is ejected at first, and further, is shaped by the roller section 25 and is cured to have a second thickness. A second material is ejected later to be applied to have a third thickness larger than the second thickness. Further, the second material is shaped by the roller section 25 and is cured to have a fourth thickness which is substantially equal to or larger than the second thickness but smaller than the third thickness. This can prevent mixture of the first and second materials, namely, the model material MA and the supporting material SA, at the boundary surface at which they contact with each other, and also, can smooth the surfaces of both the materials.

Further, the model material MA and the supporting material SA which are not ejected during the same reciprocating scanning can be alternately ejected in each reciprocating scanning, or one shaping material can be successively ejected. At this time, the minimum necessary rule is that, after the previously ejected material is smoothed by the roller section 25 and cured by the curing means, the subsequently ejected material is applied. In the examples of FIGS. 10(*a*) and 10(*b*), after the model material MA is ejected and cured in a first reciprocating scanning, the model material MA is also ejected and cured in a subsequent second reciprocating scanning. Then, in a third reciprocating scanning, successively to the line of the model material MA formed in the first reciprocating scanning, the supporting material SA is ejected and cured. Further, also in a fourth reciprocating scanning, the supporting material SA is ejected and shaped successively to the line of the model material MA formed in the second reciprocating scanning. As described above, successively ejecting one shaping material can produce a time interval until ejection of the other shaping material, and hence the shaping material can be sufficiently cured so as to reliably prevent the mixture at the boundary surface where the materials come into contact with each other. This is especially effective in the case of using a resin, which is slow in curing reaction, or the like, as the model material MA and the supporting material SA. In addition, needless to say, the foregoing series of processes for shaping the model material MA and the supporting material SA may either be overall processes based on one slice data or processes constituting a portion thereof. In the latter case where the series of shaping processes is a portion thereof, the foregoing series of shaping processes should be repeated as necessary.

Second Embodiment

Figure 9:
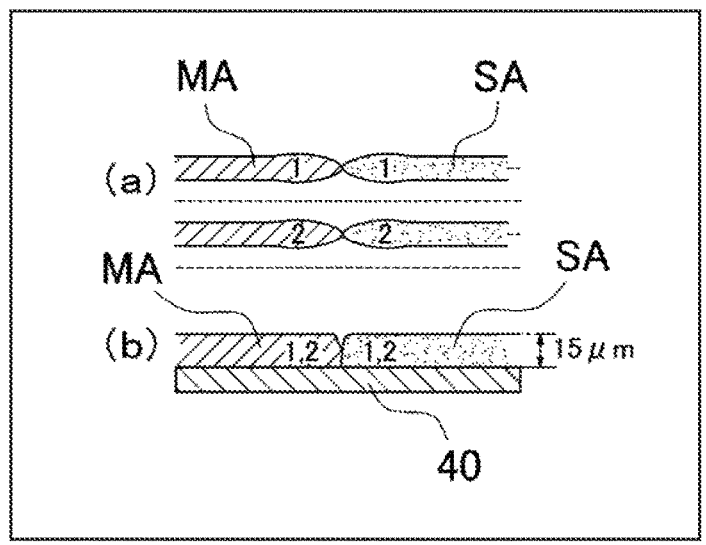
FIG. 9($a$) is a plan view and FIG. 9($b$) is a vertical sectional view illustrating an ejection pattern of ejecting the model material and the supporting material by a conventional three-dimensional shaping device.

In the above method of FIG. 10, by one shaping material being cured, mixture with the other shaping material can be reliably prevented, but two reciprocating scannings are required for shaping one line, thereby causing a defect of the cycle time becoming twice as large as that in the method of FIG. 9. Herein, an example of preventing this problem will be described as a second embodiment based on FIG. 11. This example is the same as FIG. 10 in that two lines of the model material MA are formed in the first and second reciprocating scannings. Subsequently, in the third reciprocating scanning, the model material MA is ejected and cured between the first-formed line of the model material MA and the second-formed line of the model material MA. Further, in the fourth reciprocating scanning, a line of the model material MA is formed below the second-formed line of the model material MA. After the four lines of the model material MA have been formed in such a manner, the supporting material SA is successively ejected and cured in fifth and sixth reciprocating scannings. Herein, the supporting material SA is ejected and cured each time in an amount twice as large as that in FIG. 10. For example, when the model material MA is ejected and cured to have a height of 15 µm in the example of FIG. 10, the supporting material SA is ejected and cured to have a height of 30 µm, twice as large as the above, in the example of FIG. 11. Accordingly, even in two reciprocating scannings, the supporting material SA can be formed in an amount corresponding to that in four reciprocating scanning for the model material. Consequently, in a total of six reciprocating scannings, i.e., four for the model material and two for the supporting materials, shaping equivalent to that using four lines in FIG. 9, namely, four reciprocating scannings, can be performed, and the cycle time 1.5 times as high as that that in FIG. 9 is required. As described above, it is possible to obtain an advantage of suppressing the cycle time from twice in FIG. 10 to 1.5 times, so as to reduce processing time. On the other hand, the resolution of the supporting material SA is degraded to ½ of that in FIG. 10. However, since the supporting material SA is finally removed, it does not cause deterioration in quality of the obtained shaped object.

More specifically, in this embodiment, after the model material MA is first ejected to have a first predetermined thickness, the model material MA in the uncured state is smoothed by scraping off an excessive portion of the material by the roller section 25 provided in the head section 20 in at least one forward or backward path which is different from at least one forward or backward path for ejecting the model material MA, to ensure the model material MA having a second thickness smaller than the first thickness, and the model material MA ejected by the curing means 24 onto the shaping plate 40 is cured in at least one forward or backward path which is the same as that for the smoothing operation by the roller section 25, or in at least one forward or backward path after the smoothing operation by the roller section 25. Next, after the model material MA is ejected to have the third predetermined thickness onto at least part of the surface of the model material MA formed to have the second thickness, which is actually an appropriate position based on the slice data, the model material MA in the uncured state is smoothed by scraping off an excessive portion of the material by the roller section 25 provided in the head section 20 in at least one forward or backward path which is different from at least one forward or backward path for ejecting the model material MA, to ensure the model material MA having a fourth thickness smaller than the third thickness, and the model material MA ejected onto the shaping plate 40 by the curing means 24 is cured in at least one forward or backward path which is the same as that for the smoothing operation by the roller section 25, or in at least one forward or backward path after the smoothing operation by the roller section 25. Hence, at this time, the model material has a fifth thickness as a total obtained by adding the fourth thickness to the second thickness.

Then, after the curing process on the previously ejected model material MA, the supporting material SA is subsequently ejected to have a sixth predetermined thickness which is larger than the fifth predetermined thickness of the model material described above, and thereafter the supporting material SA in the uncured state is smoothed by scraping off an excessive portion of the material by the roller section 25 provided in the head section 20 in at least one forward or backward path which is different from at least one forward or backward path for ejecting the supporting material SA, to ensure the supporting material SA having a seventh thickness which is larger than or substantially equivalent to the fifth thickness of the model material described above, and is smaller than the sixth thickness of the supporting material SA, and the supporting material SA ejected onto the shaping plate 40 by the curing means 24 is cured in at least one forward or backward path which is the same as that for the smoothing operation by the roller section 25, or in at least one forward or backward path after the smoothing operation by the roller section 25.

That is, a first material is ejected, and then, is shaped by the roller section 25 and is cured to have a fifth thickness, through two shapings repeated previously. Thereafter, a second material is ejected and applied to have a sixth thickness larger than the fifth thickness. Further, the second material is shaped by the roller section 25 and is cured to have a seventh thickness which is substantially equal to or larger than the fifth thickness but smaller than the seventh thickness. This can prevent mixture of the first and second materials, namely, the model material MA and the supporting material SA, at the boundary surface at which they come into contact with each other, and also, can smooth the surfaces of both the materials.

Figure 11:
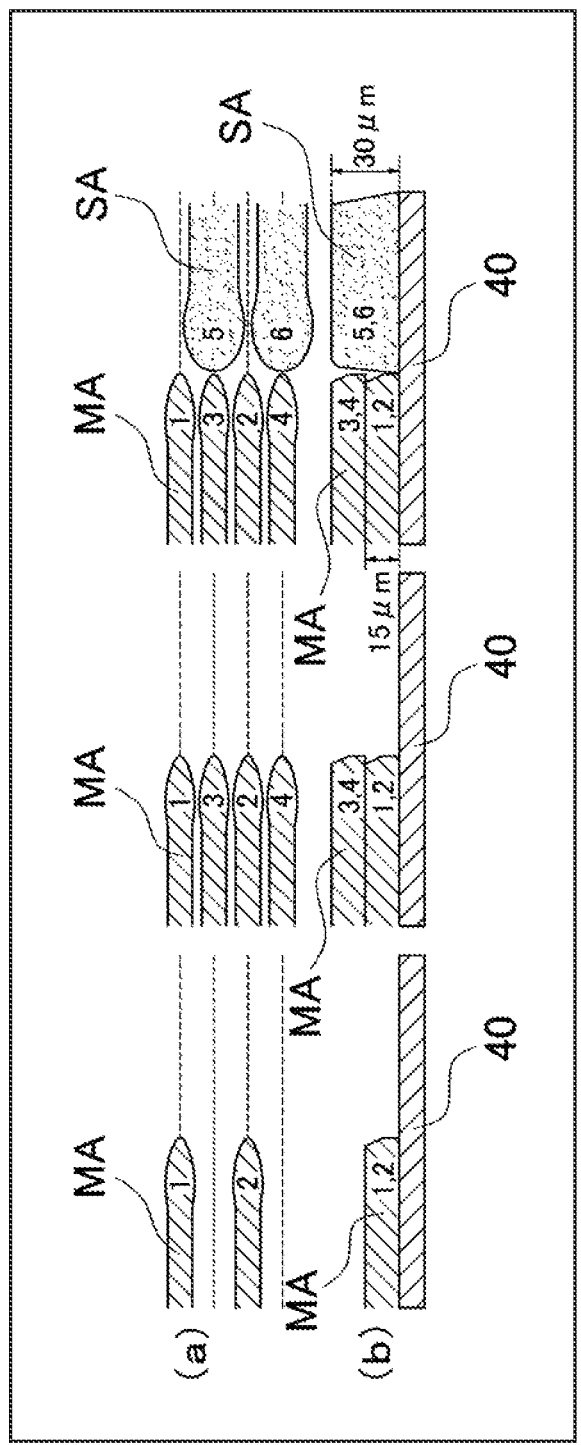
FIG. 11($a$) is a plan view and FIG. 11($b$) is a vertical sectional view illustrating an ejection pattern according to a second embodiment.

In the examples of FIG. 11, the third-formed line and the fourth-formed line of the model materials MA are between the first-formed line and the second-formed line in the example of FIG. 11(a), whereas they are on the first-formed line and the second-formed line in the example of FIG. 11(b). This is because, although the intervals between the lines are displayed to be large on the plane in FIG. 11(a), the shaping material is actually ejected as larger droplets, and as a result laminated to have large height as illustrated in FIG. 11(b).

Third Embodiment

Figure 12:
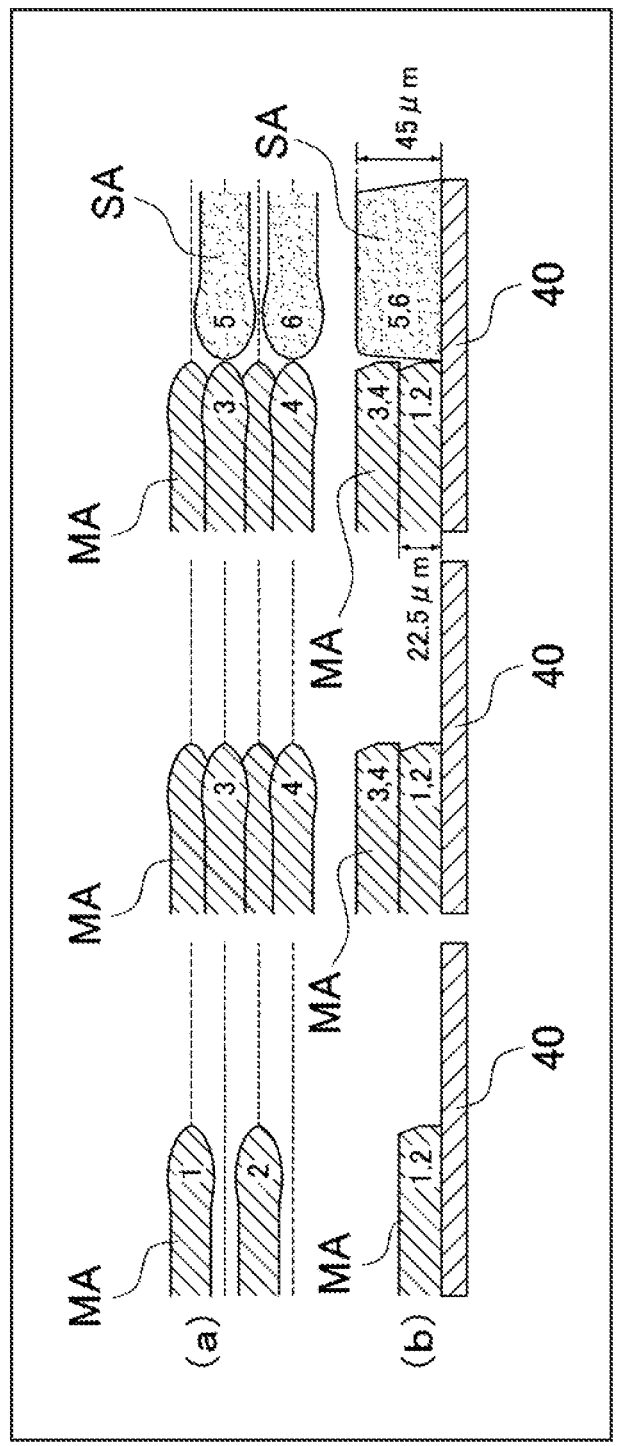
FIG. 12($a$) is a plan view and FIG. 12($b$) is a vertical sectional view illustrating an ejection pattern according to a third embodiment.

Further, the example of improving the cycle time from the second embodiment will be illustrated in FIG. 12 as a third embodiment. Herein, steps for reciprocating scanning are the same as those in FIG. 11, but an ejected amount of the shaping material is changed. Specifically, the respective ejected amounts of the model material MA are made 1.5 times as large as those in FIG. 11 (FIG. 10). For example, when the height of the formed model material MA is 15 µm in FIG. 11(b), it is 22.5 µm in FIG. 12, which is 1.5 times as large. Further, the ejected amount of the supporting material SA is 1.5 times as large as that of FIG. 11 (three times as large as that of FIG. 10). Consequently, in a total of six reciprocating scannings, the shaping material with a height up to 45 µm in total can be laminated. In comparison with FIG. 9, since the shaping materials has been shaped to a height up to 15 µm in two reciprocating scanning, shaping is performed in an amount three times as large for a length of time three times as long, and hence the cycle time is equivalent. On the other hand, the resolution of the supporting material SA is reduced to ⅓, but this is not problematical in terms of the quality since it is finally removed as described above. Further, the resolution of the model material MA is also reduced to ⅔. However, this reduction occurs units of several tens of micrometers, and therefore, it is considered to be hardly problematical in practice. Details of the present embodiment are the same as those described in the third embodiment and are not described herein.

Fourth Embodiment

Figure 13:
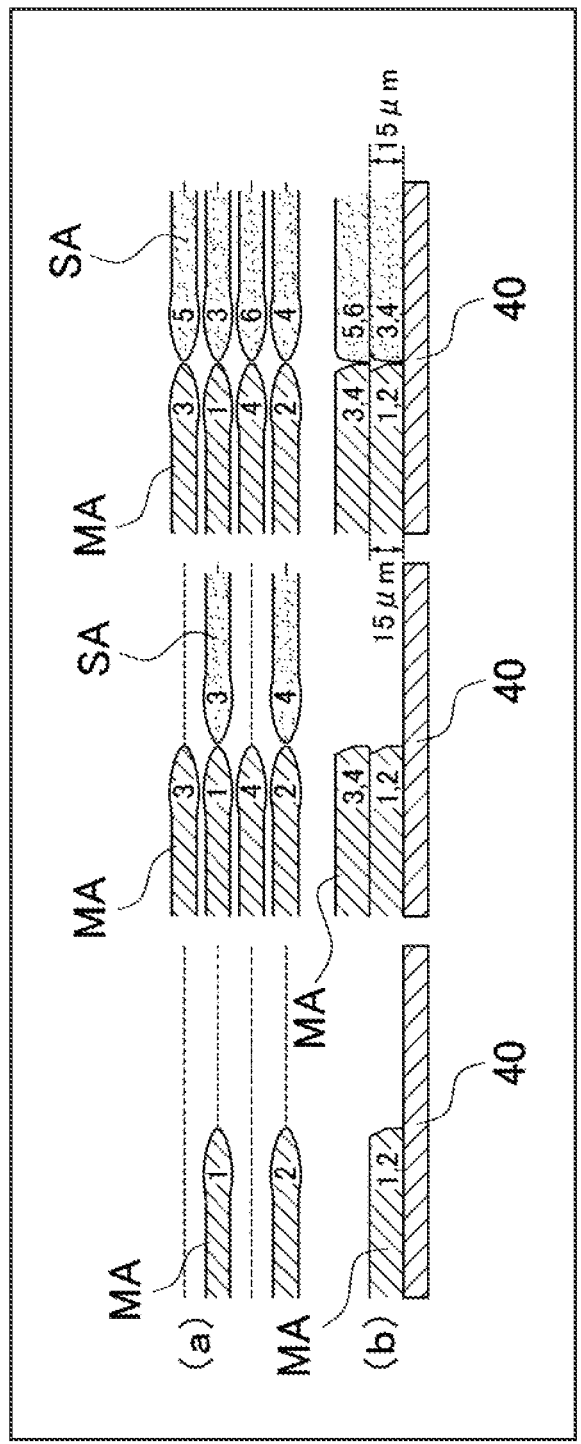
FIG. 13($a$) is a plan view and FIG. 13($b$) is a vertical sectional view illustrating an ejection pattern according to a fourth embodiment.

Meanwhile, instead of not ejecting and curing the model material MA and the supporting material SA at the same time in the same line, the model material MA and the supporting material SA can be ejected on different lines during the same reciprocating scanning. That is, the lines are made different to diagonally space the model material and the supporting material from each other on the horizontal plane. This example will be described as a fourth embodiment based on FIG. 13. Herein, ejection and curing of the model material MA in first to fourth reciprocating scannings is the same as the example in FIG. 11. On the other hand, as for the supporting material SA, after ejection of the model material MA has been completed in the forward path of the third reciprocating scanning, the supporting material SA is subsequently ejected not onto the same line but onto an offset line, which is the same line as the first-formed line of the model material MA in the example of FIG. 14(a), and cured in the backward path. Similarly, also in the fourth reciprocating scanning, after ejection of the model material MA has been completed, the supporting material SA is subsequently ejected onto an offset position, which is the same line as the second-formed line of the model material MA in the example of FIG. 14(a), and cured in the backward path. Further, also in the subsequent fifth and sixth reciprocating scannings, the supporting material SA is ejected and cured onto the same lines as the third and fourth-formed lines of the model materials MA. In this method, while the uncured model material MA and the uncured supporting material SA are both cured in the backward path of the third and fourth reciprocating scannings, that is, both materials may be mixed with each other since both of the materials are uncured in this stage, the model material MA and the supporting material SA are diagonally spaced from each other by being arranged in an offset form on the horizontal plane as illustrated in FIG. 13(a) and are diagonally spaced from each other in the height direction as a result of having different heights in the vertical direction as illustrated in FIG. 13(b), whereby the model material MA and the supporting material SA are spaced from each other both in the horizontal plane and in the vertical plane, to prevent mixture at the boundary surface where they are adjacent to each other. In this method, neither the resolution of the model material MA nor that of the supporting material SA deteriorates. On the other hand, as compared with FIG. 9 in terms of the speed, when a used amount of the ejected shaping material is 15 µm in both FIGS. 9 and 13, shaping of 15 µm of the material is possible in two reciprocating scannings in FIG. 9, whereas in FIG. 13, shaping of 30 µm of the material is possible in six reciprocating scannings, thereby involving 1.5-times cycle time in FIG. 13.

More specifically, in this embodiment, after the model material MA is first ejected to have a first predetermined thickness, the model material MA in the uncured state is smoothed by scraping off an excessive portion of the material by the roller section 25 provided in the head section 20 in at least one forward or backward path which is different from at least one forward or backward path for ejecting the model material MA, to ensure the model material MA having a second thickness smaller than the first thickness, and the model material MA ejected onto the shaping plate 40 by the curing means 24 is cured in at least one forward or backward path which is the same path as that for the smoothing operation by the roller section 25, or in at least one forward or backward path after the smoothing operation by the roller section 25. Next, after the model material MA is ejected to have the third predetermined thickness onto at least part of the surface of the model material MA formed to have the second thickness, which is actually an appropriate position based on the slice data, the model material MA in the uncured state is smoothed by scraping off an excessive portion of the material by the roller section 25 provided in the head section 20 in at least one forward or backward path which is different from at least one forward or backward path for ejecting the model material MA, to ensure the model material MA having a fourth thickness smaller than the third thickness, and the model material MA ejected onto the shaping plate 40 by the curing means 24 is cured in at least one forward or backward path which is the same path as that for the smoothing operation by the roller section 25, or in at least one forward or backward path after the smoothing operation by the roller section 25. Hence at this time, as a result of the two shapings, the model material has, in total, a fifth thickness equal to the sum of the second thickness and the fourth thickness.

Further, in at least one forward or backward path as the same application process as the application to form the third thickness of the model material MA, the supporting material SA is ejected onto an appropriate position to have a sixth thickness smaller than the fifth thickness of the model material. However, in this stage, as described above, the sixth thickness of the supporting material is smaller than the fifth thickness of the model material MA and it is thus difficult to smooth the surface of the supporting material by the roller section 25, and only the surface of the model material MA formed to have the third thickness is smoothed by the roller section 25, and thereafter the surfaces of the model material MA and the supporting material SA are cured by the curing means 24. Subsequently, the supporting material SA for forming a seventh thickness is further ejected onto the surface of the supporting material SA having the sixth thickness, and the supporting material SA in the uncured state is smoothed by scraping off an excessive portion of the material by the roller section 25 provided in the head section 20 in at least one forward path or backward path which is different from one forward or backward path for ejecting the supporting material SA, to ensure the supporting material SA having an eighth thickness which is larger than or substantially equivalent to the fifth thickness of the model material, and is smaller than the seventh thickness of the supporting material SA, and the supporting material SA ejected onto the shaping plate 40 by the curing means 24 is cured in at least one forward or backward path which is the same path as that for the smoothing operation by the roller section 25, or in at least one forward or backward path after the smoothing operation by the roller section 25.

Fifth Embodiment

Figure 14:
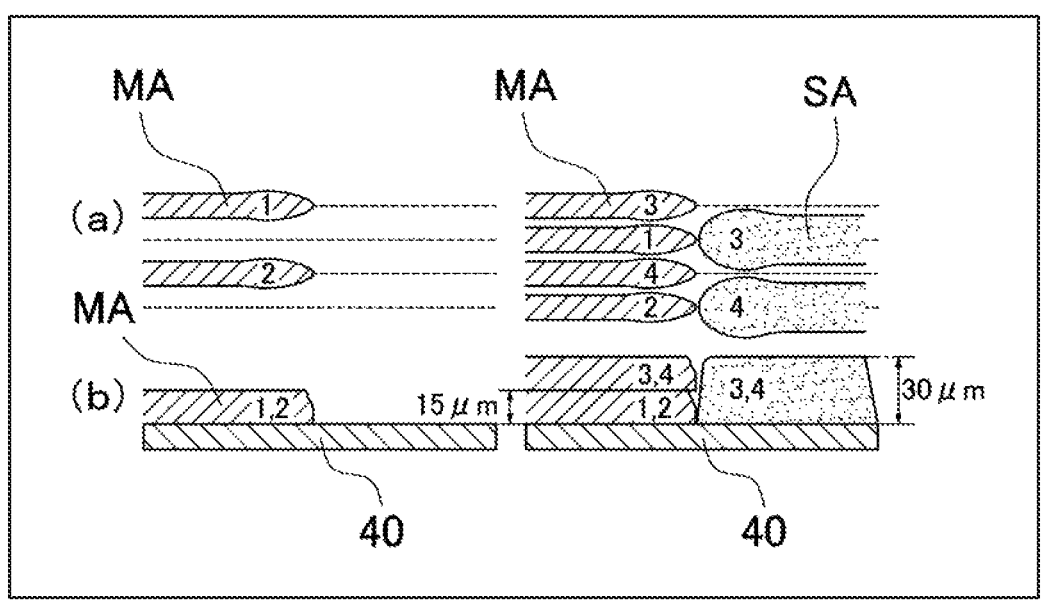
FIG. 14($a$) is a plan view and FIG. 14($b$) is a vertical sectional view illustrating an ejection pattern according to a fifth embodiment.

Further, an example of improving the cycle time from that of the fourth embodiment will be described as a fifth embodiment based on FIG. 14. Herein, the following are the same: the model material MA is ejected and cured in the first to fourth reciprocating scannings; and as for the supporting material SA, after ejection of the model material MA has been completed in the forward path of the third reciprocating scanning, the supporting material SA is ejected onto a line where the supporting material SA has been offset, which is the same line as the first-formed line of the model material MA in the example of FIG. 14(a), or after ejection of the model material MA has been completed in the forward path of the fourth reciprocating scanning, the supporting material SA is ejected onto the same line as the second-formed line of the model material MA, and cured in the backward path. Herein, the amount of ejections the supporting material SA is twice as large as that in FIG. 11. Consequently, a total of 30 μm can be shaped only through the third and fourth reciprocating scannings, and can be made equivalent to the shaping of FIG. 9. In this method, since the model material MA and the supporting material SA are adjacent to each other in the uncured state as illustrated in FIG. 14(b), mixture thereof might not be completely prevented. Further, the resolution of the supporting material SA is degraded to ½, similarly to FIG. 11.

More specifically, in this embodiment, after the model material MA is first ejected to have a first predetermined thickness, the model material MA in the uncured state is smoothed by scraping off an excessive portion of the material by the roller section 25 provided in the head section 20 in at least one forward or backward path which is different from at least one forward or backward path for ejecting the model material MA, to ensure the model material MA having a second thickness smaller than the first thickness, and the model material MA ejected onto the shaping plate 40 by the curing means 24 is cured in at least one forward or backward path which is the same path as that for the smoothing operation by the roller section 25, or in at least one forward or backward path after the smoothing operation by the roller section 25. Next, after the model material MA is ejected to have the third predetermined thickness onto at least part of the surface of the model material MA formed to have the second thickness, which is actually an appropriate position based on the slice data, the model material MA in the uncured state is smoothed by scraping off an excessive portion of the material by the roller section 25 provided in the head section 20 in at least one forward or backward path which is different from at least one forward or backward path for ejecting the model material MA, to ensure the model material MA having a fourth thickness smaller than the third thickness, and the model material MA ejected onto the shaping plate 40 by the curing means 24 is cured in at least one forward or backward path which is the same path as that for the smoothing operation by the roller section 25, or in at least one forward or backward path after the smoothing operation by the roller section 25. Hence at this time, as a result of the two shapings, the model material has, in total, a fifth thickness equal to the sum of the second thickness and the fourth thickness.

Meanwhile, after the curing process on the surface of the model material MA having the second thickness which has been ejected previously, through the same process as the process for applying the model material MA to have the third thickness, the supporting material SA is ejected to have a sixth thickness which is substantially equal to the sum of the third thickness and the second thickness of the model material MA. Thereafter, in the state where the surface of the model material MA having the third thickness and the surface of the supporting material SA having the sixth thickness are uncured, an excessive portion of the material is scraped off such that the supporting material SA has a seventh thickness substantially equal to the fifth thickness which is the total thickness of the model material MA and is equal to the sum of the second thickness and the fourth thickness, in the smoothing process by the roller section 25 in which the third thickness of the model material MA is changed to the fourth thickness. Further, the curing process is performed on the surface of the supporting material SA having the seventh thickness in the same process as the curing process performed by the foregoing curing means on the surface of the model material MA having the fifth thickness.

Sixth Embodiment

Figure 15:
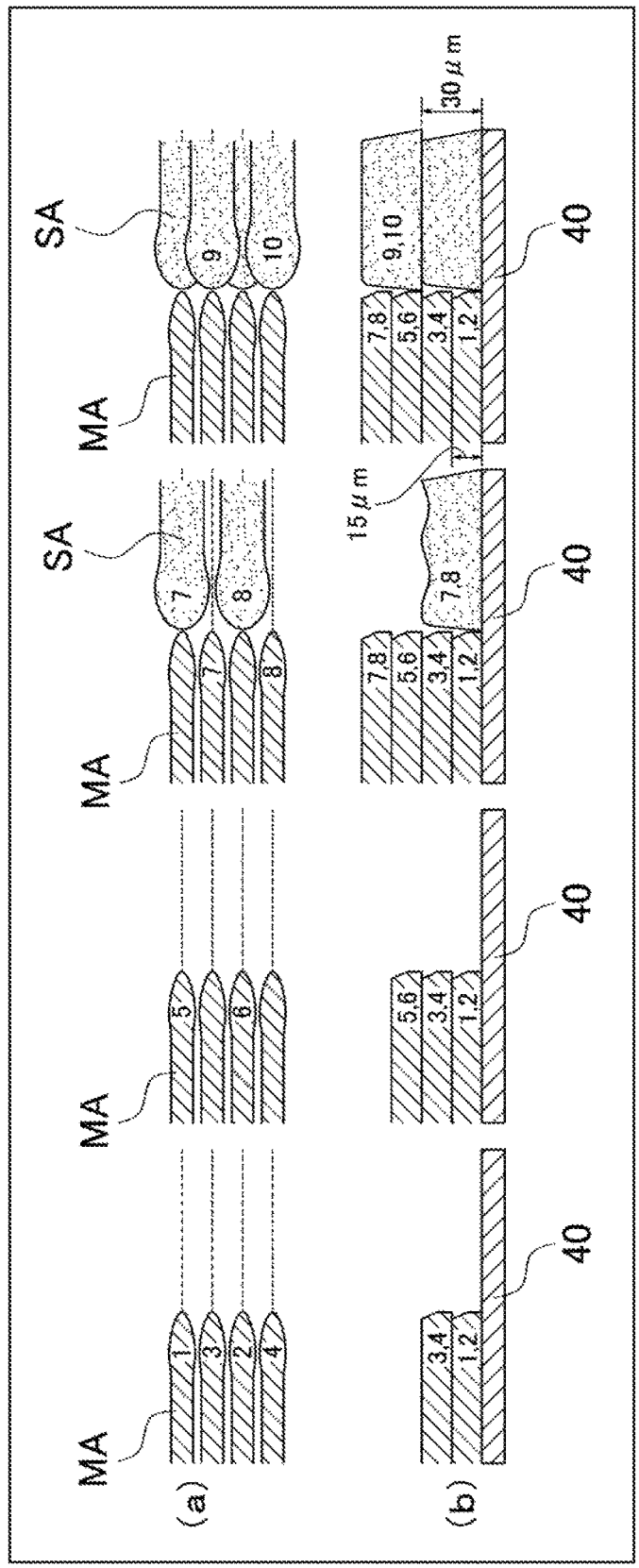
FIG. 15($a$) is a plan view and FIG. 15($b$) is a vertical sectional view illustrating an ejection pattern according to a sixth embodiment.

In the fifth embodiment described above, the model material MA and the supporting material SA are adjacent to each other in the height direction as illustrated in FIG. 14(b), thereby causing a problem in that mixture in this portion is difficult to avoid. Threat, an example in which the model material MA and the supporting material SA are further spaced from each other in the height direction to alleviate the mixture thereof will be described as a sixth embodiment based on FIG. 15. In this example, the model material MA is sequentially shaped in the first to fourth reciprocating scannings, which is the same as the example of FIG. 11. In FIG. 15, in the fifth reciprocating scanning, the model material MA is further ejected onto the same line as the first-formed line, and also in the subsequent sixth reciprocating scanning, the model material MA is further ejected onto the same line as the second-formed line. This results in the model material MA having a height corresponding to three slices, 45 µm, as illustrated in FIG. 15(b). Moreover, in the forward path of the seventh reciprocating scanning, the model material MA is ejected onto the same line as the third-formed line, and subsequently, the supporting material SA is ejected in amount twice as large onto the same line as the fifth-formed line of the model material MA. Herein, the uncured model material MA having been ejected has a height of about 60 µm, corresponding to four slices, and even when the supporting material SA in amount twice as large is ejected, its height is 30 inn. This induces a large level difference between the uncured model material MA and the uncured supporting material SA, thereby alleviating the mixture of both the materials at the boundary surface where they are adjacent to each other. Similarly, also in an eighth reciprocating scanning, subsequently to the model material MA, the supporting material SA in amount twice as large is ejected onto the same line as the sixth-formed line of the model material MA.

In these seventh and eighth reciprocating scanning, although the supporting material SA and the model material MA are both cured in the backward path, the excessive portion of the supporting material SA cannot be scraped off by the roller section 25. This is because the shaping heights of the model material MA and the supporting material SA are different as illustrated in FIG. 15(b). Accordingly, in this case, the scraping process is performed only on the model material MA by the roller section 25, in conformance to the model material MA. That is, the control means 10 controls rotation of the roller section 25 to stop the rotation of the roller section 25 when the roller section 25 passes over the supporting material SA. Since the supporting material SA will be finally removed, even if the surface thereof is slightly rough, this will induce no problem in quality of the shaping material. Further, in the subsequent ninth and tenth reciprocating scannings, only the supporting material SA is ejected and cured, and therefore, scraping is also performed by the roller section 25 to make the surface uniform. According to this method, as for the shaping time, 15 µm is shaped through two reciprocating scanning in FIG. 9, whereas 60 µm is shaped through ten reciprocating scannings in FIG. 15, thereby involving 1.25-times cycle time and degrading the resolution of the supporting material SA to ½.

In the present embodiment, basically in the same manner as in the fourth embodiment, a series of operations for ejecting, smoothing and curing the same material is repeated a plurality of times (four times in the embodiment), and a series of operations for ejecting and curing the other material is performed through the same process as the last repeated series of operations, i.e., the fourth operation (herein, the smoothing process cannot be introduced since a height of a layer to be formed is smaller than a height of the layer formed by the previously ejected material). Subsequently, the other material is ejected to ensure a height larger than the height formed by the previously ejected material, and the other material is then smoothed, to finally ensure substantially the same height as the height formed by the previously ejected material, while being subjected to the curing process by the curing means 24.

INDUSTRIAL APPLICABILITY

A three-dimensional shaping device and a three-dimensional shaping method of the present invention are preferably applied to three dimensional shaping where an ultraviolet curing resin is laminated in an inkjet manner.

DESCRIPTION OF REFERENCE NUMERALS

100 . . . three-dimensional shaping system
1 . . . set data creating device
2, 2' . . . three-dimensional shaping device
10 . . . control means
20 . . . head section
21 . . . model material ejection nozzle
22 . . . supporting material ejection nozzle
23 . . . nozzle row
24 . . . curing means
25 . . . roller section
26 . . . roller body
27 . . . blade
28 . . . bath
29 . . . absorption pipe
30 . . . head moving means
31 . . . XY-direction driving section
32, 32' . . . Z-direction driving section
40 . . . shaping plate
MA . . . model material
SA . . . supporting material
SS . . . supporting shell
PC . . . computer
SB . . . overhang supporting section

The invention claimed is:
1. A three-dimensional shaping device, which repeats an operation of ejecting, onto a shaping plate, a model material (MA) that forms a final shaped object and a supporting material (SA) that supports an overhang portion of the model material (MA) and is finally removed, as shaping materials while scanning in at least one direction, and curing the shaping materials, to form slices having a predetermined thickness in a height direction, and laminates the slices in the height direction, thereby performing shaping, the device comprising:
 the shaping plate for placing a shaped object thereon;
 shaping material ejecting device, in which a plurality of model material ejection nozzles for ejecting the model material (MA) and a plurality of supporting material ejection nozzles for ejecting the supporting material (SA) are arranged in one direction,
 curing device for curing the model material (MA) and the supporting material (SA);
 a roller section comprising a roller body for pressing the shaping material, which has been ejected onto the shaping plate, in an uncured state;
 a head section provided with the shaping material ejecting device, the roller section, and the curing device in this sequence, wherein the roller section is arranged in front of the curing device with respect to a traveling direction of the head section, wherein the roller body is rotatable in a reverse direction to the traveling direction of the head section;
 horizontal driving device for causing the head section perform reciprocating scanning in a horizontal direction;
 vertical driving device for moving relative positions in the height direction of the head section and the shaping plate;
 control device which controls driving of the horizontal driving device and the vertical driving device and controls ejection of the shaping material by the shaping material ejecting device and curing by the curing device, wherein the control device is configured to perform control such that the head section is operable to perform reciprocating scanning in one direction having a forward path and a backward path by the horizontal driving device, wherein the model material (MA) and the supporting material (SA) are ejectable onto the shaping plate by the shaping material ejecting device in the forward path of the one reciprocating scanning, and excessive ejected model material (MA) and/or the supporting material (SA) are pressable by the roller section in a backward path or a forward path which is different from the forward path in which the model material (MA) and the supporting material (SA) are ejected for pressing the surfaces thereof in an uncured state so as to smooth the shaping material surface, and the model material (MA) and/or the supporting material (SA) are curable by the curing device in at least one of forward and backward paths of the reciprocating scanning, to form the slices, and relative positions of the shaping plate and the head section are movable in the height direction to repeat lamination of the slices, thereby performing shaping, and on a line having a boundary portion where the model material (MA) and the supporting material (SA) come into contact with each other and on the line where the model material (MA) and the supporting material (SA) are located in a scanning direction of the shaped object, the model material (MA) and the supporting material (SA) are not simultaneously ejected during the same reciprocating scanning, but only one shaping material is ejected and cured, and wherein the control device is further configured to control the shaping material ejecting device, the horizontal driving device, the vertical driving device, and the curing device such that the supporting material (SA) is ejected in an amount larger than the amount of the model material (MA) which is ejected, and the supporting material (SA) is shaped with a resolution lower than a resolution for the model material (MA).

2. The three-dimensional shaping device according to claim 1, wherein one shaping material of the model material (MA) and the supporting material (SA), which is ejected and cured in one reciprocating scanning of the head section, and the other shaping material which is formed on the same line are ejected and cured in a subsequent reciprocating scanning.

3. The three-dimensional shaping device according to claim 1, wherein the head section ejects and cures one shaping material of the model material (MA) and the supporting material (SA) in a successive reciprocating scanning, and thereafter ejects and cures the other shaping material in a next reciprocating scanning.

4. The three-dimensional shaping device according to claim 1, wherein
the curing device performs curing in the backward path of the one reciprocating scanning.

5. The three-dimensional shaping device according to claim 1, wherein
the roller section is configured to scan the slice including the cured model material (MA) and the uncured supporting material (SA), and
the uncured supporting material (SA) is ejected from the shaping material ejecting device so as to have a height larger than the cured model material (MA) by an amount corresponding to a predetermined offset amount.

6. The three-dimensional shaping device according to claim 5, wherein the predetermined offset amount is set in consideration of a distribution of positional displacement in a height direction of the roller section.

7. The three-dimensional shaping device according to claim 5, wherein the amount corresponding to the offset amount is added to the supporting material (SA) located on a bottom level at each position on XY-planes of the slices successively formed on the shaping plate, and is ejected from the shaping material ejecting device.

8. The three-dimensional shaping device according to claim 1, wherein
the model material (MA) is a photo-curing resin, and
the curing device is light irradiation device for performing irradiation with light.

9. The three-dimensional shaping device according to claim 1, wherein the shaping material ejecting device ejects the model material (MA) and the supporting material (SA) such that the materials are spaced from each other.

\* \* \* \* \*